Jan. 4, 1944.   A. R. WHITTAKER   2,338,609
FLUID METER
Filed May 10, 1939   2 Sheets-Sheet 1
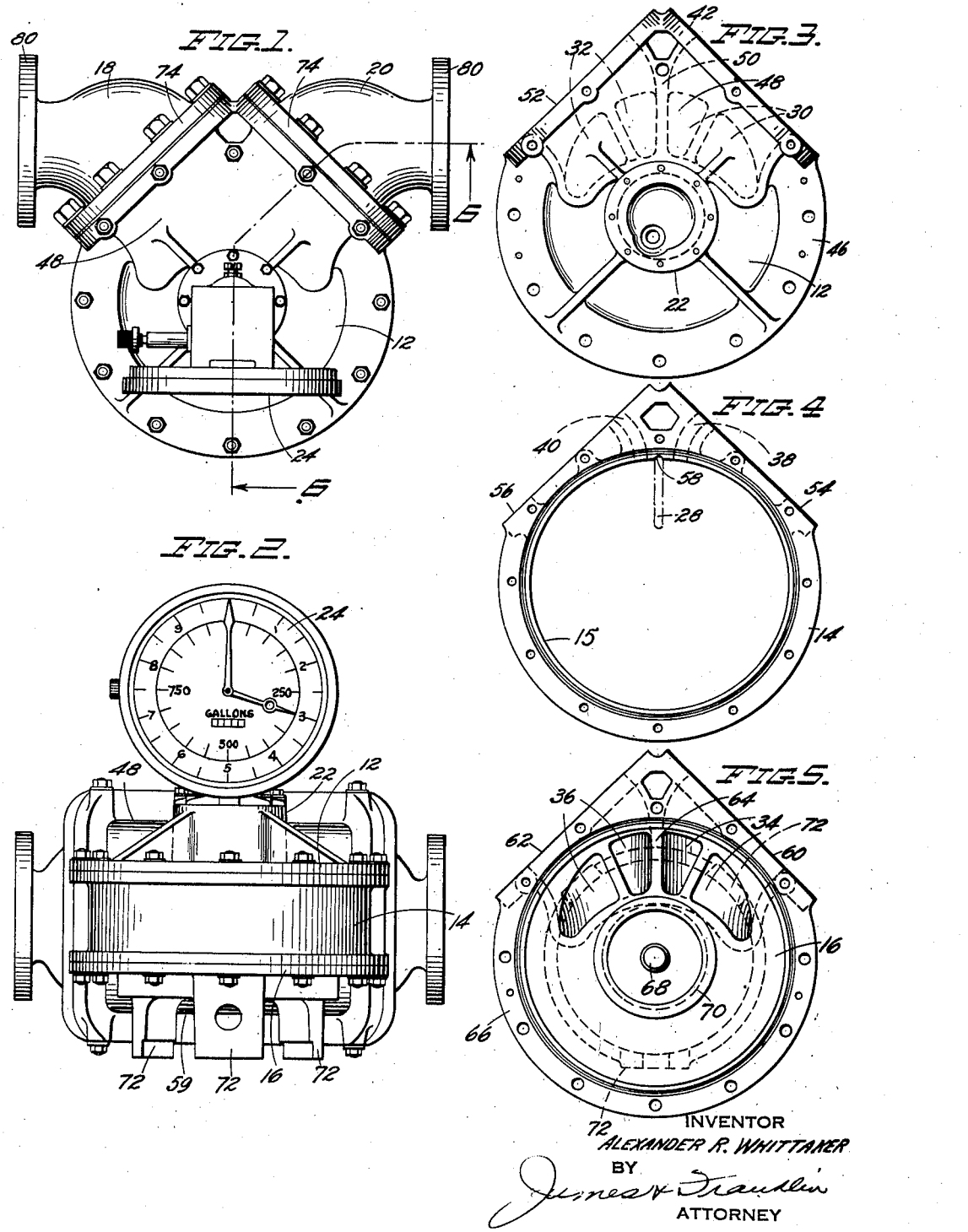
INVENTOR
ALEXANDER R. WHITTAKER
BY
ATTORNEY

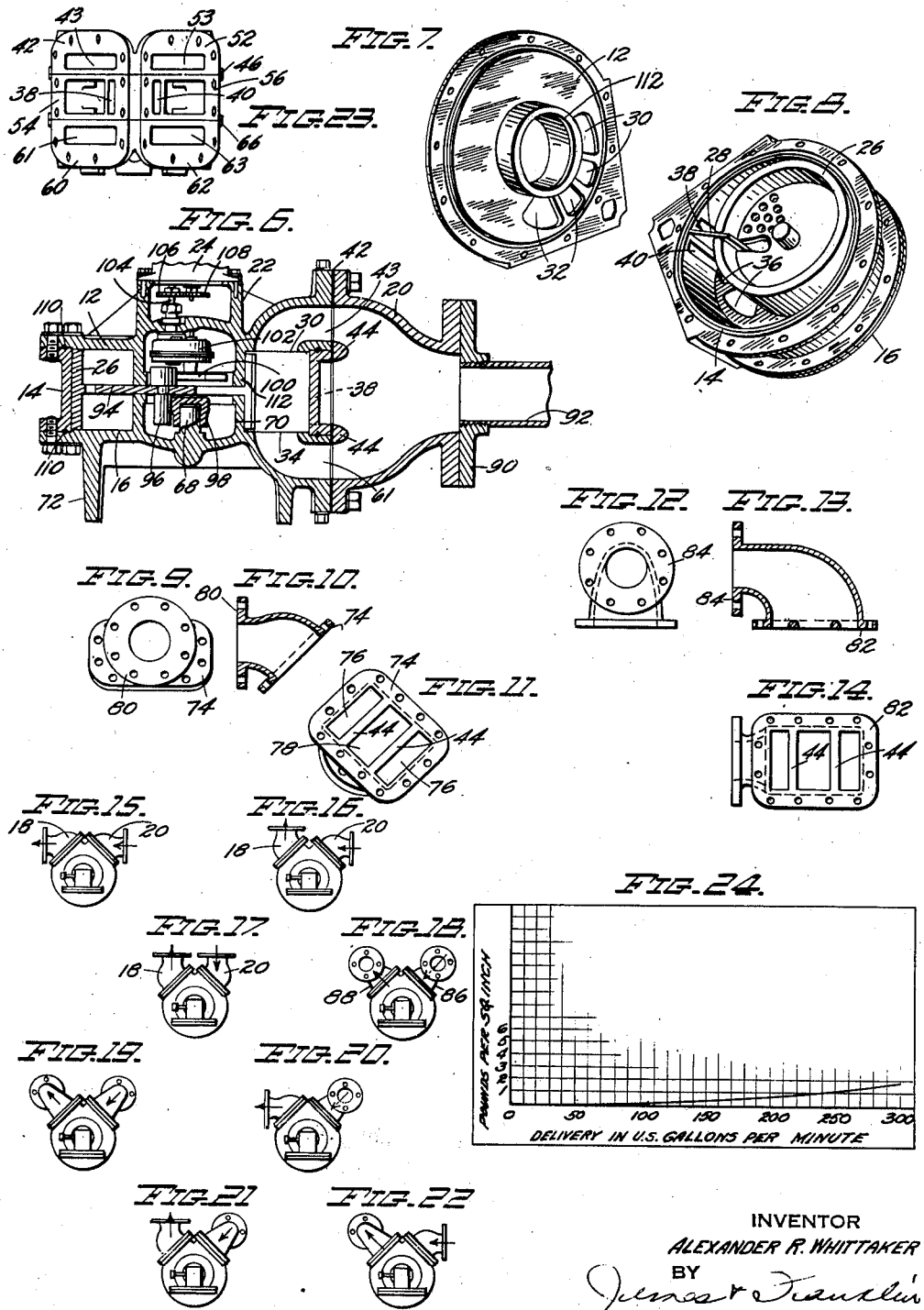

Patented Jan. 4, 1944

2,338,609

UNITED STATES PATENT OFFICE 2,338,609

FLUID METER

Alexander R. Whittaker, New York, N. Y., assignor, by mesne assignments, to Pittsburgh Equitable Meter Company, Pittsburgh, Pa., a corporation of Pennsylvania Application May 10, 1939, Serial No. 272,839

6 Claims. (Cl. 73—201)

This invention relates to meters, and more particularly to liquid displacement meters of the oscillating piston type.

An object of my invention is to very greatly reduce the loss of head encountered across such meters, particularly at high delivery rates.

Another object, or a related object considered in different aspect, is to provide an oscillating piston meter capable of continuous high speed delivery with safety, minimum wear and noise, and maintained accuracy.

Still another and yet related object is to provide a meter which will be accurate over very widely different rates of flow.

Still another object of my invention is to so design the meter and particularly the meter body and the parts thereof which act to facilitate connections thereto, as to make possible compact installations. For this purpose, removable angular meter connections provided are so designed that they may be combined with the rest of the meter body in different positions in order to accommodate sixteen different pipe connections or layouts.

On this subject, it may be mentioned that the low loss of head referred to above is measured including the loss in the angular connections, and in competitive meters the loss of head as measured for the meter would be augmented by additional loss in external elbows which would be needed for many installations.

Still further objects of my invention are to simplify the meter and to reduce its cost of manufacture.

To the accomplishment of the foregoing and other more specific objects which will hereinafter appear, my invention consists in the meter elements and their relation one to the other, as hereinafter are more specifically described in the specification and sought to be defined in the claims. The specification is accompanied by drawings in which:

Fig. 1 is a plan view of a meter embodying features of my invention;

Fig. 2 is a front elevation thereof.

Fig. 3 is a plan view of a top forming a part of the meter body;

Fig. 4 is a plan view of a cylinder forming a part of the meter body;

Fig. 5 is a plan view of a bottom forming a part of the meter body;

Fig. 6 is a section taken in elevation approximately in the plane of the bent line 6—6 of Fig. 1;

Figs. 7 and 8 show the cover of the meter body turned upwardly away from the cylinder and bottom, Fig. 7 showing the cover, and Fig. 8 showing the opened cylinder with the piston therein, Fig. 9 shows a forty-five degree connection piece looking in the plane of the circular flange;

Fig. 10 is a section therethrough;

Fig. 11 shows the same looking in the plane of the rectangular flange;

Fig. 12 shows a ninety-degree connection piece looking in the plane of the circular flange;

Fig. 13 is a section therethrough;

Fig. 14 shows the same looking in the plane of the rectangular flange;

Figs. 15 through 22 are plan views illustrating some of the many kinds of installation or pipe connection which may be made;

Fig. 23 is an elevation of the meter body with the angle connections removed, looking in the direction of the inlet and discharge ports; and Fig. 24 is a graph showing the small loss of head obtained with the present meter.

Referring to the drawings, and more particularly to Figs. 1 and 2, the meter body consists of a measuring chamber and two pieces 18 and 20 which provide inlet and outlet ports and connections for the measuring chamber. The chamber is itself made up of a cylinder 14 and top and bottom heads 12 and 16 for closing the cylinder. Altogether, then, the meter body is made up of five parts, a top 12, a cylinder 14, a bottom 16, and two connection pieces 18 and 20. Any suitable register may be mounted on top of the neck 22 of the meter, and in the present case, a register having a dial face 24 is employed. The register may be of conventional character, and requires no detailed description.

Referring now to Figs. 7 and 8, the meter is of the oscillating piston type, and comprises a piston 26 which is oscillatable within cylinder 14. The piston straddles a wall or bridge 28, and this bridge serves to separate the inlet from the discharge side of the meter. Large inlet ports 30 are provided in the top 12 at one side of the bridge, and large discharge ports 32 are provided at the opposite side of the bridge. Similar ports are provided in the bottom 16, these ports being concealed by piston 26, but a part of the discharge ports being visible at 36. The sum of the top and bottom port area is made as great as and preferably greater than the flow area of the outer or circular ends of the connection pieces 18 and 20. The wall of the cylinder 14 may also be provided with auxiliary inlet and discharge ports, as is indicated at 38 and 40. These auxiliary ports may be smaller, and are intended primarily to cushion the action of the piston at the ends of its stroke, that is, the auxiliary port on the discharge side relieves trapped liquid between the piston and cylinder wall after the top and bottom ports are cut off by the piston, and the auxiliary port on the inlet side provides impelling liquid on the outside of the piston at the very beginning of the piston stroke.

The manner in which the connection pieces form a part of the meter body, will be clear from inspection of Fig. 6. The top 12, cylinder 14 and bottom 16 combine to form a working chamber which houses the piston 26. The top and bottom are cut away at the inlet ports 30 and 34, respectively. The connection piece 20 is secured to the meter body at a flat wall 42. The passages are so shaped that the liquid is divided and guided through passages 43 and 61 to the top and bottom ports 30 and 34. The liquid also flows through the auxiliary inlet port 38 opening through the wall of the cylinder. The only obstruction at the inlet ports is that caused by the cross-bars 44 of the connection piece, and these preferably are rounded as shown, to divide the flow of liquid without appreciable disturbance or resistance.

Referring now to Fig. 3, the top 12 is flanged at 46 to mate with the top of the cylinder 14. The neck 22 for receiving the register is cast integrally with top 12, and is dimensioned to receive a standard register. The top is enlarged at 48 directly over the inlet and outlet ports, these ports being indicated at 30 and 32. The latter ports are formed through a lower wall which closes the top of the cylinder and which engages the top of the piston. The part 48 constitutes another wall at a higher level, and flow passages are formed in the hollow space between the lower and upper walls. These flow passages are divided by a partition wall 50 joining the lower and upper walls. The resulting flow passages discharge outwardly through the flat walls 42 and 52, as is best shown at 43 and 53 in Figs. 6 and 23.

Referring now to Fig. 4, the cylinder 14 consists of a cylindrical inner wall 15 formed integrally with top and bottom flanges which mate with the top and bottom of the measuring chamber of the meter body. Most of the outside wall is cylindrical, but the shape of the casting is changed to form the flat walls 54 and 56, these walls preferably being disposed parallel to the axis of the cylinder and perpendicular to each other. The wall 54 is partly cut away in order to form the inlet passage 38, and wall 56 is partly cut away in order to form the discharge passage 40. These passages are most clearly shown in Fig. 23, and have also been previously referred to in connection with Fig. 8. The bridge 28 is shown in dotted lines because it is a separate element which is inserted in place when assembling the parts of the meter body together. The outer edge of the bridge is received in a mating channel 58.

The bottom 16 of the meter chamber consists of a flat wall on which the oscillating piston rests. This wall is provided with the large inlet and outlet ports 34 and 36 previously referred to. It will be understood that the bottom 16 is enlarged downwardly beneath ports 34 and 36, just as top 12 is enlarged upwardly above ports 30 and 32, the downward enlargement being indicated at 59 in Fig. 2. The resulting passages formed between these walls extend outwardly through the flat walls 60 and 62. These passages are most clearly shown at 61 and 63 in Fig. 23. These passages are divided by partition 64. The peripheral part 66 of the bottom acts as a flange which bears against the bottom of cylinder 14 with a sealed fit. The bottom 16 includes a conventional post 68 designed to receive a roller which cooperates with the center of the piston. It is also provided with a cylindrical wall 70 which further confines and guides the orbit of the piston. Bottom 16 also differs from top 12 in having integrally cast feed 72 on which the meter may be rested.

It will be understood that the three parts of the measuring chamber just described, may be assembled in superposed relation and secured together, and that in such case, the flat walls 42, 54 and 60 of the top, middle section and bottom align to form one continuous flat wall at the inlet side of the chamber, and similarly, that the flat walls 52, 56 and 62 of the top, middle section and bottom align to form another continuous flat wall at the outlet side of the chamber. The resulting flat walls are parallel to the axis of the chamber, and are perpendicular to one another. They are generally rectangular in configuration, and are largely cut away except for mating surfaces coming between the three superposed sections of the chamber, as is best shown in Fig. 23.

The rectangular walls mate with the angle pieces which are next described. The forty-five degree connection is shown in Figs. 9, 10 and 11. It comprises a generally rectangular flange 74 which is dimensioned to be received by and bolted against either of the flat rectangular walls of the chamber (see Fig. 1). The rectangle is disposed with its longer side vertical, and with the bridges or cross-bars 44 horizontal. The end passages indicated at 76 correspond to the passages in the top and bottom of the chamber, while center passage 78 corresponds to either the passage 38 or 40 of the side wall of the cylinder.

The rectangular flange 74 may be applied to the chamber with either end uppermost, and, of course, the angle connections for both the inlet and outlet sides of the meter are alike, so that the connection may be used on either of the rectangular faces of the chamber. The other flange 80 of the angle piece is an ordinary circular flange dimensioned to receive a standard pipe flange. The flanges 74 and 80 are disposed at forty-five degrees. Thus, reverting to Fig. 1, it will be seen that when the rectangular flanges 74 are secured to the flat walls of the chamber, the circular flanges 80 are parallel and in alignment, although offset from the center of the chamber. This is the position in which the angle pieces are used when the meter is to be inserted directly in a continuous horizontal pipe line.

If the angle piece is inverted when it is being connected to the chamber, the flange 80 will assume a position perpendicular to that shown in Fig. 1. Thus, referring to Fig. 16, the angle piece 18 has been inverted, in which case the inlet pipe is disposed at right angles to the discharge pipe, both of said pipes lying in a horizontal plane. If both angle pieces are inverted, they will assume the position shown in Fig. 17, in which case the inlet and discharge pipes are collaterally disposed in parallel relation and extend rearwardly from the meter. Manifestly, the arrangement of Fig. 16 may be reversed by inverting the angle connections from the positions shown, in which case the inlet pipe will extend rearwardly from the meter, and the discharge pipe will extend sidewardly. Thus four different horizontal pipe arrangements are made possible, while using two similar forty-five degree angle connections.

I prefer to further supply the chamber with ninety-degree angle connections, and such a connection is shown in Figs. 12, 13 and 14 of the drawings. In this case the rectangular flange 82 is exactly like that previously described, and is similarly provided with cross-bars 44. Moreover, the circular flange 84 is exactly like that previously described. However, the rectangular and circular flanges are disposed relatively at right angles, as will be clearly shown in the drawings, and the bend takes place around the short edge of the rectangular flange rather than the long edge. When the angle piece is secured to the chamber, it is necessarily mounted with the long side of the rectangular flange in vertical position, and it will therefore be obvious that the ninety-degree angle connection is used for vertical pipes in contrast with the forty-five degree angle connection which is used for horizontal pipes.

When two ninety-degree angle pieces are used with the circular flanges uppermost, the arrangement takes the form shown in Fig. 18. In this case, the supply to the meter comes down a vertical pipe which is connected to angle piece 86, and the delivery from the meter rises up a vertical pipe which is connected to angle piece 88. If the angle pieces are both reversed so that the circular flanges are disposed downwardly, then the arrangement is like that shown in Fig. 19, and the meter is again connected to collateral parallel vertical pipes, but is disposed at the upper ends of the pipes rather than at their lower ends. It will be evident that one angle piece or the other may be inverted, in which case the meter may be disposed between a vertical inlet pipe above the meter, and a vertical discharge pipe below the meter, so that the liquid flows continuously downwardly; or the meter may be disposed between the vertical inlet pipe beneath the meter and the vertical discharge pipe above the meter, so that the liquid flows continuously upwardly. It will thus be seen that there are four possible vertical pipe arrangements when using two ninety-degree angle connections.

Eight further arrangements each having one horizontal and one vertical pipe, are available by using one forty-five degree and one ninety-degree angle piece. Thus, referring to Fig. 20, a ninety-degree angle connection is used for the inlet, and a forty-five degree angle connection for the outlet, these connections being so disposed that the inlet pipe extends vertically above the meter, while the discharge pipe extends horizontally toward the left of the meter. In Fig. 21, the ninety-degree inlet connection has been inverted, and the forty-five degree outlet connection has been inverted, thus making it possible to connect the meter between a vertical inlet pipe below the meter, and a horizontal discharge pipe extending rearwardly from the meter. It will be evident that by inverting one or the other of the angle connections instead of inverting both, two additional pipe arrangements are obtainable, in one of which the inlet pipe approaches the meter from below, while the discharge pipe extends horizontally to the left, and in the other of which the inlet pipe approaches the meter from above, while the discharge pipe extends horizontally to the rear of the meter. In Fig. 22 the forty-five degree angle connection has been disposed at the inlet, and the ninety-degree connection at the outlet, and in the particular arrangement shown, the inlet pipe is a horizontal pipe approaching the meter from the right, while the discharge pipe is a vertical pipe extending downwardly from the meter.

It will be evident that by reversing one or the other or both of the angle connections, three additional pipe arrangements are obtainable, in one of which the inlet pipe will approach from the right, as in Fig. 22, but the discharge pipe will extend upwardly instead of downwardly from the meter; in another of which the discharge pipe will extend downwardly as shown in Fig. 22, but the inlet pipe will approach the meter from the rear; and in still another of which the inlet pipe will approach the meter from the rear, and the discharge pipe will extend upwardly from the meter.

In all, sixteen pipe arrangements are available while using only two comparatively simple and standardized angle connection pieces. All sixteen arrangements make for compact mounting of the meter, particularly if it is kept in mind that no further elbows or fittings are needed other than a simple, flat, companion flange. In fact, what happens is that the configuration of the meter body itself is appropriately modified for each installation to best suit the direction in which the connected pipes are to run. Moreover, the loss of head is minimized because the change in direction of flow which takes place in the angle piece portion of the meter body is the only change in direction of flow.

The description so far has been general, and has not been concerned with relative dimension of parts. The proportioning of the parts is, however, a very important feature in the present invention. Specifically, the piston 26 is made large in diameter, and the cylinder 14 of the meter body is made commensurately large, relative to the size of the pipe line in which the meter is to be connected, and also relative to the capacity at which the meter is to be used. Again reverting to the specific case of a three-inch meter for a petroleum bulk station (meaning a meter which is to be used in a three-inch pipe line), I may state that in the present case, the piston 26 is dimensioned like the piston used in a standard four-inch meter adapted to handle a maximum flow, of, say, 500 gallons per minute. The cylinder 14 is dimensioned in proportion. In fact, the circular flanges of the angle connection pieces are dimensioned to mate with regular four-inch pipe flanges, and the meter might even be connected in a four-inch line, but it is not designed for this purpose. On the contrary, the companion flange 90 (Fig. 6) is a four-inch by three-inch reducing flange, (that is, a flange such as is conventionally employed when connecting together a four-inch pipe and a three-inch pipe), and has the diameter of a four-inch pipe flange (nine inches) but is threaded to receive a three-inch pipe 92. The inlet and discharge ports are especially large and generous, as was previously described, and much larger than would ordinarily be used even for a four-inch pipe. The resulting meter offers very little resistance to flow of liquid at a rate of, say, 300 gallons per minute, first, because the meter itself will handle up to 500 gallons per minute maximum, and second, because of the smoothly streamlined and oversized nature of the passages and ports leading to and from the meter piston, Because of the greatly oversized dimension of the piston, it moves at only a moderate speed when handling, say, 300 gallons per minute, thus minimizing wear and insuring accuracy of response.

The action of the meter is conventional and requires no description. Referring to Fig. 6, it may be pointed out that piston 26 has a highly perforate web 94 which is intermediate the top and bottom ends of the piston. Web 94 carries a pin 96. The latter runs about a roller 98 which is rotatable on stud or post 68 previously referred to. The top 12 is provided with a depending cylindrical wall 112 (Figs. 6 and 7), and the bottom 16 is provided with an upwardly projecting cylindrical wall 70 (Figs. 5 and 6). These cooperate with the piston and its pin or finger. The wall 70 encloses the post 68. The wall 112 encloses the intermediate 102. The upper end of piston finger 96 bears against an arm 100 mounted at the lower end of a vertical shaft extending into a so-called "intermediate" 102 having appropriate reduction gearing. The output shaft from intermediate 102 extends upwardly out of the meter casing, as is indicated at 104, and drives a gear 106 meshing with a gear 108, the shaft of which extends upwardly into the register 24.

The packing between the rectangular flanges of the angle pieces and the mating flat walls of the measuring chamber, may be regulation fibrous packing or standard type of gasket, the packing or gasket being shaped, of course, to conform to the rectangular flange. It preferably includes cross-connections mating with the cross parts of the flat surfaces, and this is the main reason for using the cross-bars 44 on the angle pieces, that is, to force the cross connections of the gasket against the ends of the metal-to-metal seams to prevent leakage therebetween. This seal is desirable to prevent leakage around the bolts holding the top and bottom to the cylinder.

For assembling the top and the cylinder, and also the bottom and the cylinder, it is necessary for proper operation of the piston to provide an accurate dimension for the interior of the chamber. The tolerance must be as close as though the parts were fitted together with an ordinary metal-to-metal joint. For this purpose, the mating flanges are each recessed with a V-shaped groove, and are assembled together with a leakproof gasket in said groove, this gasket being initially a round strip made of synthetic rubber or other composition adapted to withstand oils. For some purposes, it can be ordinary rubber. The round material is compressed and squeezed within the square gasket space, yet the mating flanges are brought directly together in metal-to-metal contact, all as will be clear from inspection of Fig. 6, the gasket being indicated at 110.

With the present construction, the cylinder for the piston is strengthened and designed to act also as the main outside casing or housing of the meter. The dimension of the meter body is greatly reduced, and the cost is also reduced, because of the comparatively small amount of metal needed.

The remarkable reduction in loss of pressure head obtained by the present invention will be clear from inspection of Fig. 24, in which it will be seen that at a flow of 300 gallons per minute, the pressure loss is less than two pounds per square inch. This is a very small fraction indeed of the pressure loss heretofore encountered with a meter of the oscillating piston type.

It is believed that the construction and method of assembly, operation, and the many advantages of my improved meter, will be apparent from the foregoing detailed description. It has a remarkably low loss of head; a high delivery at low operating speed for the mechanical parts; it is accurate over widely different rates of flow; it retains its accuracy despite large changes in viscosity, as for example, from fuel oil to gasoline; it is characterized by long wear and sustained accuracy; it is compact in dimension; it has a small flange-to-flange distance in either horizontal or vertical direction; and it is adapted for sixteen different pipe arrangements without the use of special elbows and fittings, because two angle connections which actually form a part of the meter body itself may be disposed in best position for the particular installation in which the meter is to be used.

It will be apparent that while I have shown and described my invention in a preferred form, many changes and modifications may be made in the structure disclosed, without departing from the spirit of the invention defined in the following claims.

I claim:

1. A liquid meter comprising a casing having two rectangular faces in planes at a right angle and providing a cylindrical meter chamber therein with an opening through each of said faces, an oscillating disc piston in said chamber, top and bottom covers for said chamber having ports therein and faces in alignment with the casing faces in assembled position, said covers having openings in said faces in communication with said ports, and angle connections each having a rectangular flange mating with said faces with a passageway extending normal to said flange and a circular flange disposed at an angle to said rectangular flange and having a passageway extending normal to said circular flange and merging with said passageway in a rectangular flange, said angle connections being adapted to be bolted to said faces in one of a plurality of positions whereby a plurality of pipe layouts may be connected to the meter, and gaskets clamped against the aligned faces and sealing the joints between the middle, top and bottom portions of the casing, said angle connections having portions engaging said gaskets along said sealing joints.

2. A meter comprising a meter body having two rectangular walls arranged in planes mutually at right angles, there being an inlet passage through one of said walls and an outlet passage through the other of said walls, an angle connection having a rectangular flange mating with one of said walls with a passageway extending normal to said flange and a circular flange disposed at an angle to said rectangular flange and having a passageway extending normal to said circular flange and merging with said passageway in a rectangular flange, said angle connection being adapted to be bolted to the wall in one of a plurality of positions whereby a plurality of pipe layouts may be connected to the meter, said angle connection being adapted also to mate with the other of said rectangular walls of the meter body.

3. A meter comprising a meter body having two rectangular walls arranged in planes mutually at right angles, there being an inlet passage through one of said walls and an outlet passage through the other of said walls, an angle connection having a rectangular flange mating with one of said walls with a passageway extending normal to said flange and a circular flange disposed at an angle of forty-five degrees to said rectangular flange and having a passageway extending normal to said circular flange and merging with said passageway in the rectangular flange, said angle connection being adapted to be bolted to the wall in one of a plurality of positions whereby a plurality of pipe layouts may be connected to the meter, said angle connection being adapted also to mate with the other of said rectangular walls of the meter body.

4. A meter comprising a meter body having two rectangular walls arranged in planes mutually at right angles, there being an inlet passage through one of said walls and an outlet passage through the other of said walls, an angle connection having a rectangualr flange mating with one of said walls with a passageway extending normal to said flange and a circular flange disposed at an angle of ninety degrees to said rectangular flange and having a passageway extending normal to said circular flange and merging with said passageway in the rectangular flange, said angle connection being adapted to be bolted to the wall in one of a plurality of positions whereby a plurality of pipe layouts may be connected to the meter, said angle connection being adapted also to mate with the other of said rectangular walls of the meter body.

5. A meter comprising a meter body having two rectangular walls arranged in planes mutually at right angles, there being an inlet passage through one of said walls and an outlet passage through the other of said walls, an angle connection having a rectangular flange mating with one of said walls with a passageway extending normal to said flange and a circular flange disposed at an angle of forty-five degrees to said rectangular flange, a second angle connection having a rectangular flange mating with the other of said walls with a passageway extending normal to said flange and a circular flange disposed at an angle of ninety degrees to said rectangular flange, said angle connections being interchangeable and being adapted to be removably secured to a rectangular wall in any of four positions whereby eight different pipe layouts may be connected thereto.

6. A liquid meter comprising a casing having two plane faces at an angle and providing a cylindrical meter chamber therein with openings through said faces, a piston in said chamber, circumferential grooves in the top and bottom edges of said casing, top and bottom covers for said chambers having mating circumferential grooves therein and having ports communicating with said chamber, said covers having plane faces adapted to register with the plane faces of the casing in assembled position and having openings in said faces in communication with said ports, gaskets in said grooves clamped between said casing and covers to provide non-leakable joints, said gaskets being sufficiently yieldable to allow metal to metal contact between said casing and said top and bottom covers, and connections having flanges mating with said plane faces of the body and covers and having passageways through said flanges mating with the openings through said faces, and adapted to be secured thereto.

ALEXANDER R. WHITTAKER.